July 19, 1932. C. A. PENN Re. 18,529
CIGARETTE PACKAGE
Original Filed Feb. 16, 1929
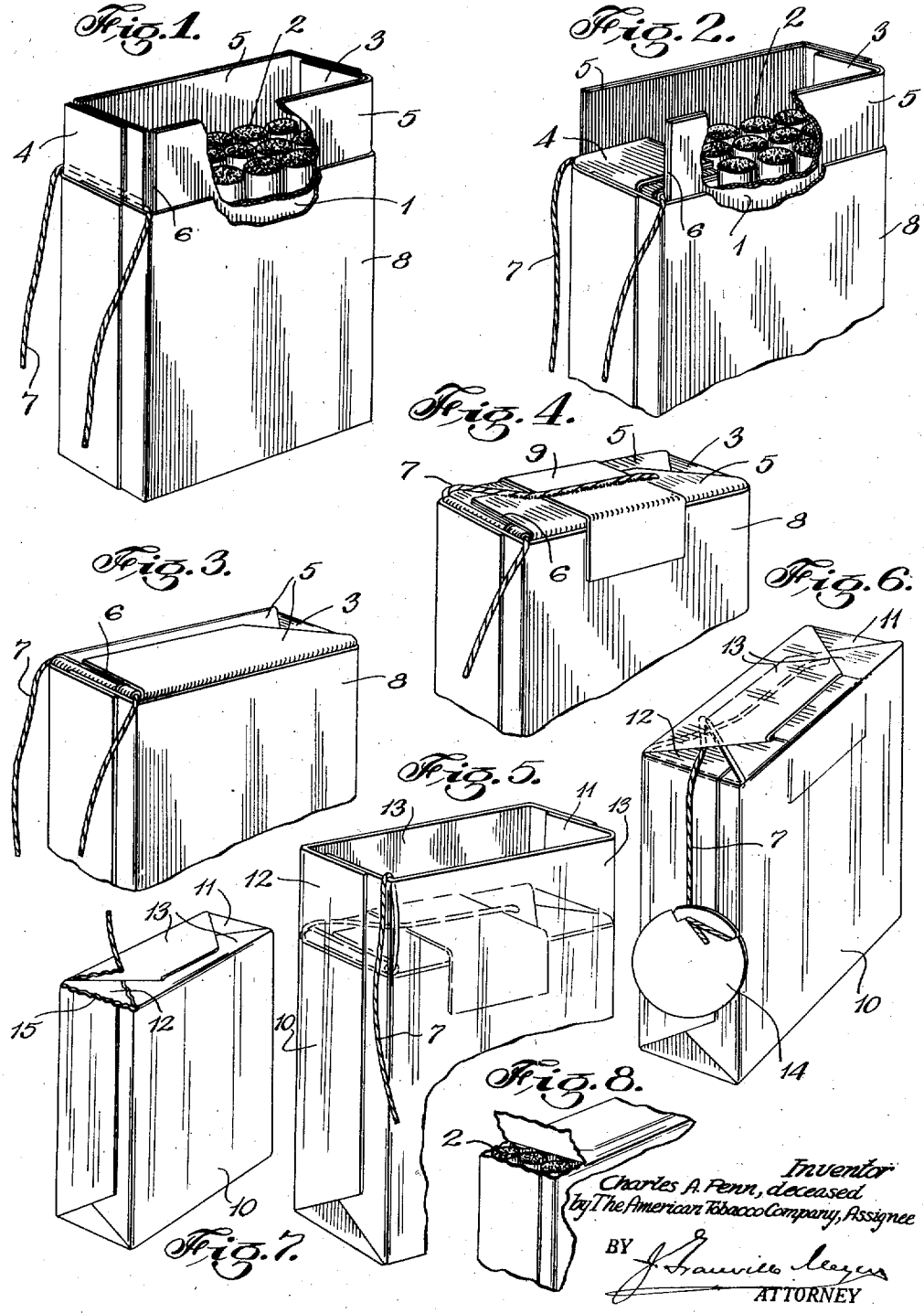
Inventor
Charles A. Penn, deceased
by The American Tobacco Company, Assignee
BY J. Granville Meyer
ATTORNEY Reissued July 19, 1932

Re. 18,529

UNITED STATES PATENT OFFICE

CHARLES A. PENN, DECEASED, LATE OF NEW YORK, N. Y., BY THE AMERICAN TOBACCO COMPANY, OF NEW YORK, N. Y., ASSIGNEE, A CORPORATION OF NEW JERSEY

CIGARETTE PACKAGE

Original No. 1,759,366, dated May 20, 1930, Serial No. 340,503, filed February 16, 1929. Application for reissue filed April 22, 1932. Serial No. 607,014.

This invention is an improvement in cigarette packages, and more particularly in a package designed to conform in appearance to that of a package of a selected smoking tobacco.

Many smokers prefer to make their own cigarettes, and certain types of smoking tobacco have been widely advertised and are known practically wherever cigarettes are smoked as designed for a filler in hand made cigarettes.

In order to enable the advertising of the brand of smoking tobacco and the fame of said tobacco to inure to the benefit of the same tobacco when in cigarette form, it is desirable that there be something more than the mere statement that the filler of the cigarette is of the well known tobacco.

One of the primary objects of the present invention is a method of marketing such tobacco in the form of cigarettes, in a package conforming in appearance to that of the original package of the brand of smoking tobacco, and having in connection therewith certain characteristics of the form.

Another object is the provision of a package of the character in question having in connection therewith a pendant, in the form of a cord and an attached tag, designed to resemble a bag of smoking tobacco with a tag.

Another object is the provision of a string and tag, designed to simulate the draw string of a bag, so connected with the package that when the draw string is partially detached from the package, the end of the package will be opened to enable access to the cigarettes.

Another object is the provision of a package of cigarettes shaped, and having in connection therewith well known characteristics of the original package of the brand of smoking tobacco used as a filler for the cigarettes, thereby to obtain for the new form the advantages in the way of fame and advertising accruing to the brand.

With these and other objects in view the invention consists in the construction and novel combination of parts fully described hereinafter, illustrated in the accompanying drawing, and pointed out in the claims appended hereto, it being understood that various changes in the form, proportion, size and minor details of construction within the scope of the claims, may be resorted to without departing from the spirit of the invention.

In the drawing forming a part hereof:—

Fig. 1 is a perspective view of a package of cigarettes, prior to the closing of the end, and with a part broken away.

Fig. 2 is a similar view showing the first step of folding.

Fig. 3 is a perspective view of a part of the package, showing the top folded.

Fig. 4 is a similar view with the stamp in place and one end of the cord connected.

Fig. 5 is a perspective view of a part of the package showing the method of placing the outer wrapper, usually of transparent paper.

Fig. 6 is a perspective view of the completed package.

Fig. 7 is a similar view showing the first step in the operation of opening the package.

Fig. 8 is a similar view of a part of the package showing it completely opened.

Cigarettes of the character in question are usually put up in a wrapper of foil, or a composite wrapper of foil and paper.

Outside of this is a shuck of somewhat heavier paper, and the outer wrapper is of transparent material, such for instance, as glassine paper. In Fig. 1, the wrapper of foil or foil and paper, indicated at 1, is placed adjacent to the cigarettes 2. The open end of the foil wrapper is closed usually by pushing in the end folds indicated at 3 and 4, onto the ends of the cigarettes, and afterwards pushing in the side folds 5, and securing them together.

In the present arrangement, one of the end folds 4 is separated from the side folds 5 by slits indicated at 6, and prior to the folding of the fold 4 a cord 7, of the type used as draw strings for tobacco bags, is placed across the package end, just inside of the fold 4. The fold 4 is now folded down upon the cigarette ends and the cord.

The package so formed is placed in the shuck, as shown in Fig. 3, after which the revenue stamp 9 is placed across the sealed folds 5, and one end of the cord 7 is secured to the stamp and to the folds 5, in any suitable manner, as for instance, by paste. Afterwards the glassine wrapper 10 is placed, and the open end is folded in the same manner as the wrapper 1, that is, by pushing in the end folds 11 and 12, and afterwards the side folds 13, which are then sealed together.

In pushing in the end fold 12, the other end of the cord, namely; that to which the tag 14 is attached, is pushed in with the fold, so that it lies partly beneath the fold, as shown in Fig. 6, wherein that part of the cord which is covered, is indicated in dotted lines. The tag 14 may be attached to the cord in any suitable manner, as for instance, in the manner shown, or by passing the cord through an opening in the tag. The tag bears advertising matter of the same character as is found on the corresponding tag of a bag of smoking tobacco.

In opening the package, the cord is pulled outward, and breaks the transparent wrapper. Further outward pulling upon the cord cuts the inner wrapper and the outer wrapper along the lines indicated at 15 in Fig. 7, but leaves the pendant, that is, the cord and tag attached.

In practice, the cigarettes are packaged by machinery, which forms the wrapper 1 about a suitable number of cigarettes, inserts the package so formed into the shuck, or folds the shuck about the package, and afterwards applies the stamp and the glassine wrapper. The tearing cord may be placed by the same machinery, so that the entire operation of wrapping and placing the cord is automatic. The end of the package is usually sealed by wax, and this wax holds the connected part of the cord to the package.

What is claimed as new is:

1. A cigarette package having at one end a fold free at its side edges from the adjacent folds, a tearing cord lying beneath said fold, said cord having a portion connected with the folded end of the package and another portion connected with a tag.

2. A package of cigarettes designed to simulate a bag of smoking tobacco of a standard brand provided with a draw string having a tag at the free end thereof, the package being of substantially the shape and size of the bag, and including an inner and an outer wrapper folded at one end of the cigarettes, the inner wrapper having a fold free at its side edges from the other folds, a tearing cord having the intermediate portion thereof covered by the free fold, one of the ends of the cord being secured to the folded end of the inner wrapper, and that portion of the other end adjacent to the free fold being folded inwardly beneath the adjacent fold of the outer wrapper, leaving the extremity of the cord free, said extremity being provided with a tag.

3. A cigarette package including an inner wrapper and an outer wrapper, the inner wrapper having at one end a fold free at its side edges from the adjacent fold, a tearing cord having the intermediate portion thereof lying beneath said fold, one of the ends of the cord being connected to the folded end of the inner wrapper, and that portion of the other end adjacent to the free fold being folded in with the adjacent fold of the outer wrapper, leaving the extremity of said end free, whereby when the said end is drawn outward both folds will be separated to enable access to the cigarettes.

4. A package of cigarettes designed to simulate a bag of smoking tobacco of a standard brand, provided with a draw-string having a tag at the free end thereof, the package being of substantially the shape and size of the bag, and including an inner and an outer wrapper folded at one end of the cigarettes, the inner wrapper having a fold free at its side edges from the other fold, a tearing cord having the intermediate portion thereof covered by the free fold, and that portion of one end of the cord adjacent to the free fold being folded inwardly beneath the adjacent fold of the outer wrapper, leaving the extremity of the cord free, said extremity being provided with a tag.

5. A cigarette package including an inner wrapper and an outer wrapper, the inner wrapper having at one end a fold free at its side edges from the adjacent fold, a tearing cord having the intermediate portion thereof lying beneath said fold, and that portion of one end of the cord adjacent to the free fold being folded in with the adjacent fold of the outer wrapper, leaving the extremity of said end free, whereby when the said end is drawn outward both folds will be separated to enable access to the cigarettes.

6. A cigarette package having at one end a fold free at its side edges from the adjacent folds, a tearing cord having an intermediate portion lying beneath said fold, said cord having one end portion connected to the folded end of the package and the other free end portion pendant.

Signed at New York city, in the county of New York, and State of New York, this 21st day of April, 1932.

THE AMERICAN TOBACCO COMPANY,
Assignee of CHARLES A. PENN (Deceased),
By J. R. CUMMINGS,
*Assistant Secretary.*